United States Patent
Yang et al.

(10) Patent No.: US 8,027,328 B2
(45) Date of Patent: *Sep. 27, 2011

(54) HEADER COMPRESSION IN A WIRELESS COMMUNICATION NETWORK

(75) Inventors: Tomas S. Yang, Parsippany, NJ (US); Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 994 days.

This patent is subject to a terminal disclaimer.

(21) Appl. No.: 11/644,879

(22) Filed: Dec. 26, 2006

(65) Prior Publication Data
US 2008/0151901 A1    Jun. 26, 2008

(51) Int. Cl.
H04J 3/24 (2006.01)
H04J 3/16 (2006.01)
H04J 3/00 (2006.01)
H04L 12/28 (2006.01)
G06F 15/16 (2006.01)
H04B 1/00 (2006.01)

(52) U.S. Cl. ........ 370/349; 370/394; 370/466; 370/521; 709/247; 455/72

(58) Field of Classification Search .................. 370/389, 370/349, 394, 466, 521; 709/247; 455/72
See application file for complete search history.

(56) References Cited

U.S. PATENT DOCUMENTS

| | | | |
|---|---|---|---|
| 6,680,955 B1 | 1/2004 | Le | |
| 6,788,675 B1* | 9/2004 | Yang | 370/352 |
| 7,124,349 B2 | 10/2006 | Barrett et al. | |
| 7,133,943 B2 | 11/2006 | Carnevale et al. | |
| 7,298,717 B2 | 11/2007 | Hui et al. | |
| 7,359,372 B2 | 4/2008 | Pelletier et al. | |
| 7,697,447 B2 | 4/2010 | Harris | |
| 2001/0030963 A1* | 10/2001 | Yoshimura et al. | 370/393 |
| 2001/0030965 A1 | 10/2001 | Tourunen et al. | |
| 2002/0089998 A1* | 7/2002 | Le | 370/465 |
| 2002/0150092 A1 | 10/2002 | Bontempi et al. | |
| 2003/0039270 A1 | 2/2003 | Chang et al. | |
| 2003/0079230 A1 | 4/2003 | Woodward, Jr. et al. | |
| 2004/0022262 A1 | 2/2004 | Vinnakota et al. | |
| 2004/0088642 A1 | 5/2004 | Imura et al. | |

(Continued)

FOREIGN PATENT DOCUMENTS

EP   1056259   11/2000

(Continued)

OTHER PUBLICATIONS

Bormann et al., RFC 3095—RObust Header Compression (ROHC): Framework and four profiles: RTP, UDP, ESP and uncompressed, Jul. 2001.*

(Continued)

Primary Examiner — Alpus H Hsu
Assistant Examiner — Jeremy Costin
(74) Attorney, Agent, or Firm — Harness, Dickey & Pierce, P.L.C.

(57) ABSTRACT

In one embodiment, a relationship is determined between radio link protocol (RLP) sequence numbers in received RLP packets and real-time protocol (RTP) sequence numbers in RTP packets decompressed from the received RLP packets. An RTP sequence number associated with a compressed RTP packet is determined based on the determined relationship and at least one of the RLP sequence numbers of the received RLP packet or packets forming the compressed RTP packet. An RTP time stamp may be determined in a similar manner.

24 Claims, 3 Drawing Sheets

U.S. PATENT DOCUMENTS

| | | | |
|---|---|---|---|
| 2004/0095939 A1 | 5/2004 | Yang | |
| 2004/0179689 A1 | 9/2004 | Maggenti et al. | |
| 2004/0264433 A1* | 12/2004 | Melpignano | 370/349 |
| 2005/0157696 A1 | 7/2005 | Yamamoto | |
| 2005/0193309 A1 | 9/2005 | Grilli et al. | |
| 2006/0002416 A1 | 1/2006 | Yagihashi | |
| 2006/0120352 A1* | 6/2006 | Agashe et al. | 370/352 |
| 2007/0047547 A1* | 3/2007 | Conner et al. | 370/392 |
| 2007/0047551 A1* | 3/2007 | Conner et al. | 370/394 |
| 2008/0025312 A1* | 1/2008 | Kuppuswamy et al. | 370/392 |

FOREIGN PATENT DOCUMENTS

| | | |
|---|---|---|
| WO | WO 00/79762 | 12/2000 |
| WO | WO 01/67709 | 9/2001 |
| WO | WO 02/45357 | 6/2002 |

OTHER PUBLICATIONS

Jonsson et al., RObust Header Compression (ROHC): A Link-Layer Assisted Profile for IP/UDP/RTP, Apr. 2002.*

Bormann et al., "Robust Header Compression (ROHC): Framework and Four Profiles: RTP, UDP, ESP and Uncompressed, RFC 3095", Internet Engineering Task Force (IETF), Jul. 2001, XP015008878 Section 4.5.4.

Svanbro, "Lower Layer Guidelines for Robust RTP/UDP/IP Header Compression, RFC 3409", Internet Engineering Task Force (IETF), Dec. 2002, XP015009203 Section 2.2.

International Search Report and Written Opinion dated Jul. 8, 2008.

J. Postel, RF 768 (rfc768)—User Datagram Protocol, Aug. 28, 1980, pp. 1-3.

J. Sjoberg et al., "Real-Time Transport Protocol (RTP) Payload Format and File Storage Format for the Adaptive Multi-Rate (AMR) and Adaptive Multi-rate Wideband (AMR-WB) Audio Codecs", Network Working Group, Request for Comments: 3267, Category: Standards Track, Jun. 2002, pp. 1-35.

L-A. Larzon et al., "The Lightweight User Datagram Protocol (UDP-Lite), RFC 3828 (rfc3828)", Network Working Group, Request for comments: 3828, Category: Standards Track, Jul. 2004, pp. 1-9.

G. Pelletier, "Robust Header Compression (ROHC): Profiles for User Datagram Protocol (UDP) Lite", RFC 4019 (rfc4019), Network Working Group, Request for Comments: 4019, Category: Standards Track, Apr. 2005, pp. 1-16.

International Search Report and Written Opinion of the International Authority dated Apr. 3, 2008, for counterpart International Application No. PCT/US2007/025552.

* cited by examiner

HEADER COMPRESSION IN A WIRELESS COMMUNICATION NETWORK

BACKGROUND OF THE INVENTION

The Internet Protocol (IP) has become the dominant transport protocol in both wireline and wireless networks, which has led to the convergence of telecommunication and data networks. In many services and applications (e.g., Voice over IP (VoIP), interactive games, instant messaging, etc.), the payload of an IP packet is almost of the same size or even smaller than the header. In addition to the IP network protocol, other protocols (e.g., real-time protocol (RTP), user datagram protocol (UDP), etc.) are added to the original information bits for effective transport in a packet data network.

Fortunately, it is not necessary to send the enormous RTP/UDP/IP header for each packet all the time. Instead a header compression algorithm such as the robust header compression (RoHC) may be used. The principle behind header compression is that most of the fields in the RTP/UDP/IP header are static; hence they can be sent once uncompressed during a first communication (e.g., the initial transmitted packets in a wireless system) from the compressor at the transmission side to the decompressor at the reception side. Once the decompressor has reliably acquired the static information, the compressor starts sending compressed headers carrying information regarding the dynamic parts of the header. From the compressed header, the decompressor is able to fully reconstruct the RTP/UDP/IP header and pass the packet on. In this way, the large headers are not transmitted for each packet, leading to tremendous savings in capacity.

However, current header compression schemes do have some drawbacks. For ease of explanation, these drawbacks will be described with respect to header compression implemented in a conventional wireless communication system.

Figure 1:
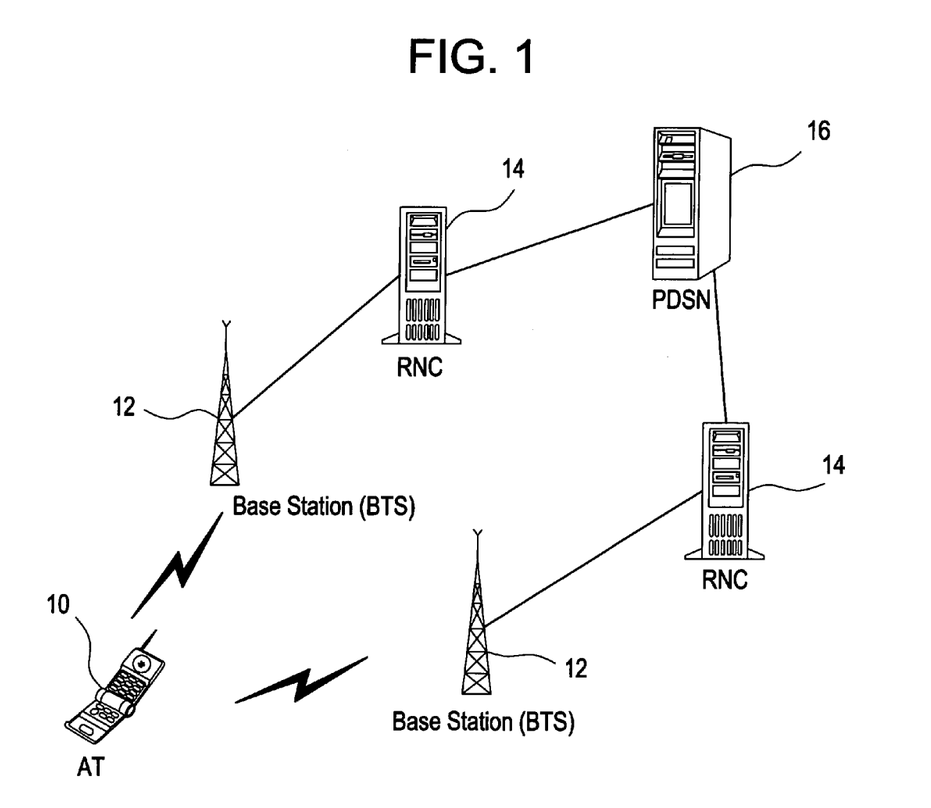
FIG. 1 illustrates a well-known wireless communication network.

FIG. 1 illustrates a general architecture of a well-known wireless communication network. As shown, an access terminal (AT) 10 communicates with a base station (BTS) 12 over an air interface. Examples of an AT include a mobile station, a mobile unit, a wireless phone, wireless equipped PDA or computer, etc. Multiple base stations 12 communicate with a radio network controller (RNC) 14, which provides signaling and traffic processing for each wireless data session. FIG. 1 shows the AT 10, BTS 12, RNC 14 and the interfaces between these components form what is known as a radio access network (RAN). The RAN communicates with a core network to access, for example, the internet. In the example of FIG. 1, the core network includes one or more packet data service nodes (PDSNs) 16 connected between the RNCs 14 and, for example, the internet (not shown).

As examples, header compression may occur between the AT 10 and the PDSN 16, between the AT 10 and the RNC 14, etc. When the AT 10 establishes a connection with the network, for example, a VoIP call, the application layer packet will be carried over the RTP/UDP/IP protocol stacks. The RTP/UDP/IP headers will be compressed by a compressor at the AT 10 using, for example, the RoHC algorithm mentioned above. The compressed packet will be sent uplink from the BTS 12 to the RNC 14 and from the RNC 14 to the PDSN 16. The decompressor at the RNC 14 or the PDSN 16 decompresses the RoHC header to re-establish the RTP/UDP/IP header. Similarly, on the downlink direction, the PDSN 16 and RNC 14 receive packets and the compressor at the PDSN 16 or RNC 14 compresses the RTP/UDP/IP headers to generate the RoHC or compressed header. The packet with compressed header is sent to the BTS 12 and on to the AT 10. A decompressor at the AT 10 decompresses the RoHC header to obtain the original RTP/UDP/IP header, and passes the packet onto the application layer.

Figure 2:
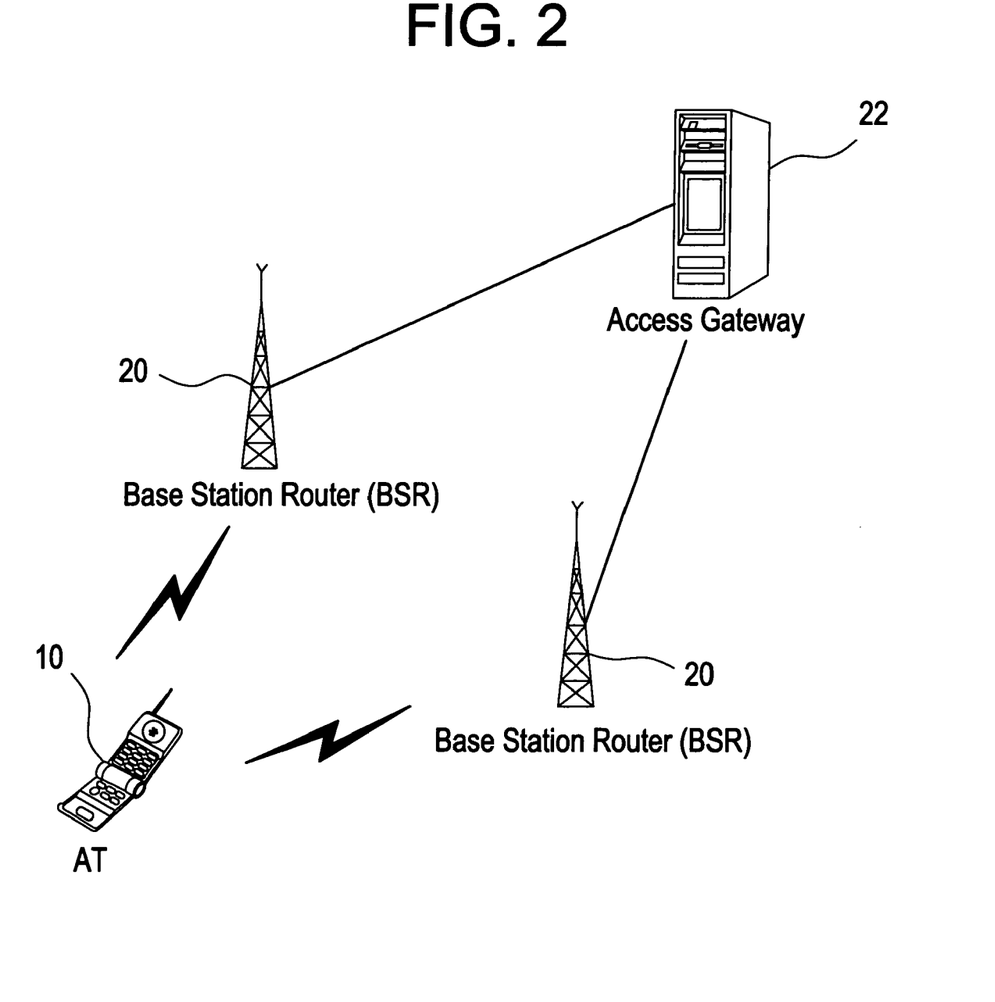
FIG. 2 illustrates a so called flat IP wireless communication network.

FIG. 2 illustrates another architecture of a wireless communication network—the so called flat IP network architecture. As shown, the AT 10 communicates with a base station (BS) 20 over an air interface. The BS 20 converges multiple mobile network elements into a single entity and combines the signaling and bearer into one IP connection. In this flat IP architecture, the BS 20 contains all the radio access technology based functionalities. In other words, the functionalities in BTS, RNC and PDSN of FIG. 1 are be converged to the BS. The BS 20 functions like a router in the network and communicates with other BSs and network elements. Compared to FIG. 1, there are no separate RNC and PDSN elements anymore. The BS may also communicate with an access gateway 22, which provides for external connection to other networks such as the internet.

In the architecture of FIG. 2, header compression may occur between the AT 10 and the BS 20, or between the AT 10 and the access gateway 22. When the AT 10 establishes a connection with the network, for example, a VoIP call, the application layer packet will be carried over the RTP/UDP/IP protocol stacks. The RTP/UDP/IP headers will be compressed by a compressor at the AT 10 using, for example, the RoHC algorithm mentioned above. The compressed packet will be sent uplink from the AT 10 to the BS 20, or from the AT 10 to the BS 20 and from the BS 20 to the access gateway 22. The decompressor at the BS 20 or the access gateway 22 decompresses the RoHC header to re-establish the RTP/UDP/IP header. Similarly, on the downlink direction, the access gateway 22 and BS 20 receive packets, and the compressor at the access gateway 22 or the BS 22 compresses the RTP/UDP/IP headers to generate the RoHC or compressed header. The packet with the compressed header is sent to the AT 10. A decompressor at the AT 10 decompresses the RoHC header to obtain the original RTP/UDP/IP header, and passes the packet onto the application layer.

The robust header compression (RoHC) algorithm uses several encoding methods, including the window-based least significant bits encoding algorithm, for the compression of the dynamic fields in the protocol headers. The RoHC compression algorithm also incorporates a feedback mechanism. The RoHC compression algorithm is very efficient on wireless links with high error rates and/or long round trip time. Because of its efficiency and robustness, the RoHC compression algorithm is suitable on wireless networks where the radio resource is costly.

When there are large consecutive packet losses in the link layer and/or a large degree of packets out of order, the decompressor is not able to decompress newly received packets. When decompression failure happens, the decompressor will loose its context. The context of a header compression session is the state of the compressor and the state of the decompressor, and these states must be synchronized for successful header reconstruction. The decompressor usually sends a feedback packet to the compressor instructing the compressor to resynchronize the compression status by sending the full header. The decompressor will discard received packets with the compressed header, including uncorrupted packets, until the full header information is received in an uncompressed packet. As a result, during resynchronization between the compressor and decompressor, additional packet losses will occur, degrading the performance and quality of the call. These packet losses caused by loss of synchronization between the compressor and decompressor should be minimized or eliminated.

SUMMARY OF THE INVENTION

The present invention relates to improving header compression/decompression over the radio link. In particular, the present invention provides a local repair mechanism at the decompressor that assists the decompressor in recovering from a decompression failure event (e.g., packet loss/errors or out-of-sequence receipt of packets) without having to resynchronize the compressor and decompressor.

In one embodiment, a relationship is determined between radio link protocol (RLP) sequence numbers in received RLP packets and real-time protocol (RTP) sequence numbers in RTP packets decompressed from the received RLP packets. A RTP sequence number associated with a compressed RTP packet is determined based on the determined relationship and at least one of the RLP sequence numbers of the received RLP packet or packets forming the compressed RTP packet.

In another embodiment, a relationship is determined between protocol time stamps associated with received RLP packets and RTP time stamps in RTP packets decompressed from the received RLP packets. The protocol time stamp is a time stamp added by a network elements interface protocol (e.g., a BTS/RNC interface protocol). A RTP time stamp associated with the compressed RTP packet is determined based on the determined relationship and at least one of the protocol time stamps of the received RLP packet or packets forming the compressed RTP packet.

In a further embodiment, a RTP time stamp associated with the compressed RTP packet is determined based on at least one protocol time stamp of the received RLP packet or packets forming the compressed RTP packet, the protocol time stamp of a previously received RLP packet, and the RTP time stamp of a previously received RTP packet. The protocol time stamp is a time stamp added by a network elements interface protocol.

In a still further embodiment, a relationship is determined between RTP sequence numbers and associated RTP time stamps, and a RTP time stamp associated with the compressed RTP packet is determined based on the determined RTP sequence number and the determined relationship.

In yet other embodiments, when the interface between the network elements (e.g., between BTS and RNC) is simplified and converged (e.g., in the BS architecture), the use of the protocol time stamps in the above described embodiments may be replaced with a time stamp derived from at least one of the transmission packet information and local timing information.

BRIEF DESCRIPTION OF THE DRAWINGS

The present invention will become more fully understood from the detail description given herein below and the accompanying drawings which are given by way of illustration only, wherein like reference numerals designate corresponding parts in the various drawings, and wherein.

DETAILED DESCRIPTION OF EXAMPLE EMBODIMENTS

Referring to FIG. 1 discussed above, data packet transmissions over the link layer of the wireless network contain information to ensure packet delivery and processing at the RAN. For example, the radio link protocol (RLP) layer at a transmitter encapsulates the RoHC packet and provides a sequence number (SN) in an RLP header for packet delivery. The sequence number is incremented for each RLP packet transmission, and therefore, provides a mechanism for properly ordering packets received out-of-order at the receiver. This mechanism may also be used to recognize missing data packets.

Furthermore, the interface over the backhaul between the BTS 12 and RNC 14 adds another protocol (hereinafter "BTS/RNC interface protocol") for encapsulating the RLP packets. More specifically, the BTS/RNC interface protocol maintains timing information (e.g., a time stamp) on when RLP packets are sent between the BTS and the RNC. On the reverse link, this timing information represents the transmitting time the RLP packets are sent from the AT and passed by the BTS to the RNC. On the forward link, there is a time stamp field in the BTS/RNC interface protocol, representing the time the RLP packet was generated at the RNC. When the BTS receives the packet, it can make use of the timing information in its transmission scheduling decision.

Referring to FIG. 2 discussed before, in a flat IP architecture where the network elements BTS and RNC are converged to a single element BS, the interface protocol between the functional entities BTS and RNC can be simplified. The protocol time stamps can be replaced by a time stamp derived from the transmission time of the packet and the local time at the BS. Namely, the protocol time stamp is one of the values in the interface protocol field, and the BS has the perfect knowledge of this information, since it generates the RoHC packets, and also receives the packets from the AT. On the forward link, the BS obtains the time stamp based on the time instance when a RoHC packet is generated. On the reverse link, the BS receives a packet from the AT and knows exactly when the packet is sent from the AT based on the transmission format and MAC header information. The following descriptions with regard to the use of protocol time stamps are equally applicable to the derived time stamps in the flat IP architecture of FIG. 2.

The inventors have recognized that when each RLP packet contains one or more RoHC packet, there is a unique mapping between the RLP SN and the compressed RTP SN in the RoHC header. Furthermore, when a RLP packet contains a portion of a RoHC packet, the "first data" and "last data" field in the RLP header can be used to reassemble a complete upper layer packet. In other words, if the "first data" field in the RLP header is set to 1, it means that this RLP packet contains the first portion of an upper layer packet. If the "last data" field is set to 1, it means that this RLP packet contains the last portion of an upper layer packet. If both "first data" and "last data" field is set to 1, it means that this RLP packet contains a complete upper layer packet. In these different cases, there exists a unique mapping between the RLP SN and the RTP SN. Therefore, the inventors have recognized that the RLP SN can be used to recover the RTP SN if the RTP SN cannot be decoded successfully by the RoHC decompressor. In addition, because the BTS/RNC interface protocol time stamp represents the transmission timing information, the inventors have recognized that the BTS/RNC interface protocol time stamp has a unique relationship with the RTP time stamp. This relationship especially pertains to the reverse, or uplink, where the RTP/UDP/IP packets are generated by the application layer at the AT 10, compressed with the RoHC, and sent out sequentially. In the architecture of FIG. 2, it is the derived time stamp that has the unique relationship with the RTP time stamp.

If the received RTP/UDP/IP packets are in order, and the RTP time stamp has a distinct pattern, then the time stamp in the BTS/RNC interface protocol header correlates to the RTP time stamp. For example, a VoIP packet's RTP time stamp is incremented by a fixed interval (usually 20 ms or 160 samples). The time stamp in the BTS/RNC interface protocol is also incremented by approximately the same interval if the arrival time of each VoIP packet does not vary too much. In general, the VoIP packets arriving at the RNC have been passed through the networks. Each packet will experience delay and delay jitter when it arrives at the RNC. On the other hand, the RTP time stamp in each VoIP packet represents the sampling time generated at the originating source (i.e., voice codec). Unless each VoIP packet experiences the same delay and thus there is no delay jitter between the VoIP packets, the arrival time of the packets at the RNC will not have the same distinct pattern as the original RTP packets. Therefore, an estimation method according to embodiments of the present invention may be used to find the mapping between the RTP time stamps and the time stamps in the BTS/RNC interface protocol.

Let $TS_{RTP1}$ (converted to ms from number of samples) be the time stamp of an RTP packet, and $TS_{Interface1}$ (in ms) be the time stamp of the corresponding RLP packet in the BTS/RNC interface protocol. Let $TS_{RTP2}$ (converted to ms from number of samples) be the time stamp of the next consecutive RTP packet, and $TS_{Interface2}$ (in ms) be the time stamp of the corresponding RLP packet in the BTS/RNC interface protocol. And let $TS_{RTP\_interval}$ be the time stamp interval between the RTP packets (i.e., 20 ms). The mapping between the time stamps in the interface protocol and the RTP time stamps may be determined as follows:

$$TS_{RTP2} - TS_{RTP1} \cong int\left(\frac{TS_{interface2} - TS_{interface1}}{TS_{RTP\_interval}}, 1\right) \cdot TS_{RTP\_interval} \quad (1)$$

where the int( ) is integer operation in units of 1. Therefore, if $TS_{RTP2}$ cannot be decoded correctly, the time stamps in the interface protocol may be used to estimate $TS_{RTP2\_estimated}$ as follows:

$$TS_{RTP2\_estimated} \cong \quad (2)$$
$$TS_{RTP1} + int\left(\frac{TS_{interface2} - TS_{interface1}}{TS_{RTP\_interval}}, 1\right) \cdot TS_{RTP\_interval}$$

When there is a jump in the RTP time stamp during the silence compression, the above method may still be used to estimate the RTP time stamp.

In the architecture of FIG. 2, the same method may be applied by using the derived time stamps in place of the protocol time stamps.

When the received RTP/UDP/IP packets are out of order, if the RoHC compressor resides in the RNC, the RoHC compressor can inform the RLP layer about the reordering situation and the time stamps in the interface protocol can be set promptly. If the ROHC compressor resides in PDSN, the PDSN passes the reordering situation to the RNC so that the RNC can use it promptly. Therefore the same estimation method may be used to estimate the RTP time stamp if the ROHC decompressor cannot decode the time stamps correctly.

Next, embodiments of the present invention will be described in detail. First, an embodiment of an architecture and a method for header decompression with link layer assistance on a reverse link will be described. Then, an embodiment of an architecture and a method for header decompression with link layer assistance on a forward link will be described. For ease of explanation only, these embodiments will be described as employed on the wireless communication network of FIG. 1. However, it will be understood that the architecture and methods of the present invention are not limited to this wireless system or even to wireless systems. For example, the descriptions below may also apply to the architecture of FIG. 2 with the derived time stamp used instead of the protocol time stamp.

Reverse Link

Figure 3:
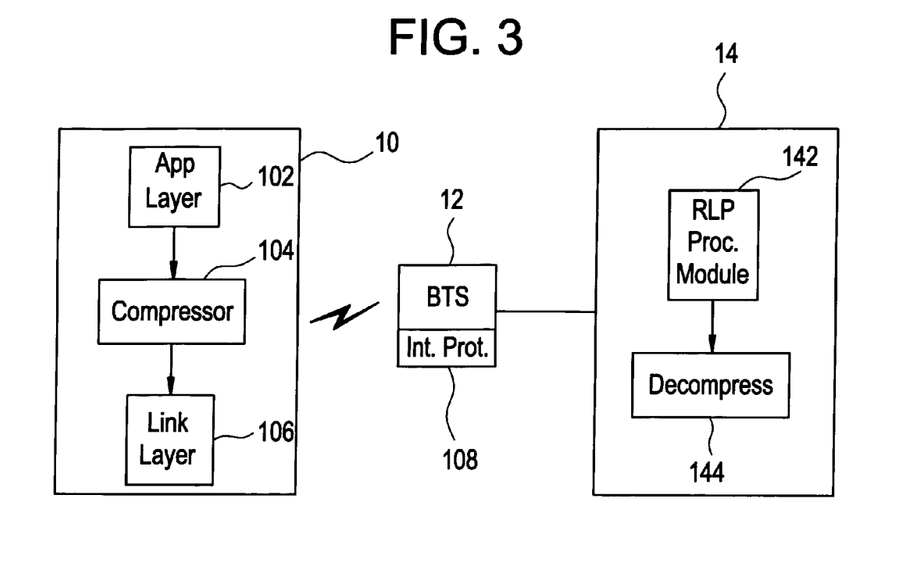
FIG. 3 illustrates the architecture of a portion of a wireless communication system for reverse link communication according to an embodiment of the present invention.

FIG. 3 illustrates a functional block diagram of the AT 10, BTS 12 and the RNC 14 operating on a reverse link, or uplink, according to an embodiment of the present invention. It will be understood that specific details of the AT 10, BTS 12 and RNC 14 well-known in the art have not been shown for the sake of clarity.

Robust Header Compression (RoHC) channels may be established between the AT 10 and the BTS 12, the AT 10 and RNC 14 or the AT 10 and the PDSN 16. For the reverse link, a compressor 104 and decompressor 144 may reside at the AT 10 and RNC 14 (as shown in FIG. 3), respectively. This embodiment will be described using this implementation. However, the description is equally applicable to the decompressor residing at the BTS 12 (albeit, the BTS 12 extracts or generates the link layer information) or the PDSN 16 (albeit, the RNC 14 passes the link layer information to the PDSN 16).

As shown, the AT 10 includes an application layer IP generator 102 that generates IP packets for a particular application. For example, a VoIP call consists of voice frame(s) encapsulated into a RTP/UDP/IP packet. With the establishment of a connection, the application layer generator 102 generates an application layer packet, which via the protocol stack becomes an RTP/UDP/IP packet. A header compressor 104 compresses the RTP/UDP/IP packets into RoHC packets, for example, using the RoHC algorithm. Subsequently, a link layer packet generator 106 generates a link layer packet by placing RoHC packets into a RLP packet. The link layer generator 106 may perform concatenation or fragmentation on the upper layer packets. In this example, a RLP packet can consist of one or multiple RoHC packets. It can also contain only a portion of a RoHC packet. The size of the RLP packet is determined based on the available transmission rate the AT can use at the time. As mentioned above, the RLP layer provides its own SN in the RLP header for packet delivery to provide a mechanism for recognizing missing data packets.

The BTS 12 receives the RLP packet, and an interface protocol 108 adds a header to the RLP packet. More specifically, the BTS/RNC interface protocol 108 encapsulates the RLP packets, and the header of the interface protocol packet includes a packet ID (or a time stamp) representing the transmission timing information of the RLP packet at the AT 10. The BTS 12 passes the RLP packet to the RNC 14 or PDSN 16 (not shown) for decompression. Other protocols in addition to the RLP and interface protocol may be added depending on the system design.

The RNC 14 includes a RLP processing module 142 and a decompressor 144. The RLP processing module 142 receives the RLP packet, obtains the RTP/UDP/IP packet there from, and passes the RLP SN and transmission timing information (hereinafter interchangeably referred to as "link layer information") to the decompressor 144 along with the RTP/UDP/IP packet.

The decompressor 144 decompresses the RTP/UDP/IP packets in the well-known manner according to, for example, the RoHC algorithm. As a result of the decompression, the decompressor 144 obtains, among other things, the RTP sequence number and the RTP time stamp. The decompressor 144 maps the RLP sequence number to the RTP sequence number, and maps the BTS/RNC interface protocol timing information to the RTP time stamp. For example, for three consecutive packets, the RLP sequence numbers may be 20, 21 and 22, and the associated three RTP sequence numbers may be 8, 9 and 10. Accordingly, RLP sequence number 20 is mapped (e.g., stored in association with) to RTP sequence number 8, RLP sequence number 21 is mapped to RTP sequence number 9, etc. as shown in Table 1 below.

TABLE 1

| RLP Sequence Number | RTP Sequence Number |
|---|---|
| 20 | 8 |
| 21 | 9 |
| 22 | 10 |

Alternatively, if the RLP and RTP sequence numbers increment by a fixed amount and a same fixed offset exists between associated RLP and RTP sequence numbers, then the decompressor 144 may instead, or in addition, store the offset amount.

In the case where an upper layer ROHC packet is fragmented into multiple RLP packets, the "first data" and "last data" field in the RLP header can be used to determine the frame boundary (the first portion and the last portion) of the ROHC packet. For example, for six consecutive packets, the RLP sequence numbers may be 20, 21, 22, 23, 24, and 25. The "first data" field in RLP packet 20 is 1, but the "last data" field is 0. This indicates that RLP packet 20 is the first portion of a ROHC packet. The "first data" and "last data" in RLP packet 21 are both zero. The "first data" in RLP packet 22 is zero, and the "last data" in RLP packet 22 is 1. Therefore, RLP packets 20, 21, and 22 form a complete ROHC packet, with a corresponding RTP SN of 8. The "first data" field in RLP packet 23 is 1 again, indicating the start of another upper layer packet. Accordingly, RLP sequence number 20 is mapped (e.g., stored in association with) to RTP sequence number 8, RLP sequence number 23 is mapped to RTP sequence number 9, etc. as shown in Table 2 below.

TABLE 2

| RLP Sequence Number | RTP Sequence Number |
|---|---|
| 20 | 8 |
| 21 | (8) |
| 22 | (8) |
| 23 | 9 |
| 24 | (9) |
| 25 | (9) |
| 26 | 10 |

In this example, the RLP SN to RTP SN mapping is unique but is 3 to 1 mapping.

The interface protocol timing information and the RTP time stamp are mapped in the same manner as the RLP to RTP sequence number mapping.

When there are many packets with errors and/or loss of packets over the wireless link, the RLP processing module 142 will discard the corrupted packets without passing them to the decompressor 144. Packets are also received out-of-order over the wireless link.

Eventually, packets may again be successfully received. The successfully received packets will be passed by the RLP processing module 142 to the decompressor 144. However, because of the decompression failure event (e.g., packet loss/errors or out-of-sequence receipt of packets), the decompressor 144 may not be able to decompress the received packet. This results in decompression failure. When this occurs, the decompressor 144 invokes a local repair mechanism using the link layer information and attempts to decompress the received packets for which decompression failure occurred.

The repair mechanism involves determining a RTP sequence number and RTP time stamp for the packet causing decompression failure. To determine the RTP sequence number, the decompressor 144 uses the RLP sequence number for the packet, and the RLP-to-RTP sequence number map. Using the RLP-to-RTP sequence number map of Table 1 given above, an example of a RTP sequence number repair operation will be described. If the RLP sequence number of the received packet is 25, then the decompressor 144 recognizes that the RLP packets with sequence numbers 23 and 24 were missed. The decompressor 144 also determines that the RTP sequence numbers for those missing packets would have been 11 and 12—this follows the sequence set forth in Table 1. Accordingly, the decompressor 144 determines 13 as the RTP sequence number for the received packet having 25 as the RLP sequence number.

Alternatively, or additionally, the decompressor 144 may have determined the RLP-to-RTP mapping offset. In the example of Table 1, this offset would be −12. Accordingly, using this mapping offset, the RLP sequence number of 25 is mapped to a RTP sequence number of 13 (=25+(−12)).

In the same manner, the decompressor 144 may also determine the RTP time stamp from the BTS/RNC timing information. For example, Table 3 shows the value of packet ID (or time stamps) in the interface protocol (in unit of 4 slots, or 6.67 ms), the corresponding transmission time (in ms), the RTP time stamp value (in unit of samples), and the corresponding sampling time.

TABLE 3

| Packet ID | Corresponding transmission time (ms) | RTP Time Stamp | Corresponding sampling time (ms) |
|---|---|---|---|
| 6 | 40 | 160 | 20 |
| 9 | 60 | 320 | 40 |
| 12 | 80 | 480 | 60 |

The transmission time can be correlated with the RTP time stamp. In this example, the transmission time is mapped to the RTP packet sampling time by an offset of 20 ms, i.e., 40 ms is mapped to 20 ms. If there are missing packets, the decompressor 144 cannot decompress the packet successfully. Assuming the next successfully received packet has an ID of 24, the decompressor 144 can first map the value of packet ID 24 to 160 ms (i.e., 24*6.67=160 ms) transmission time, then map 160 ms to 140 ms (i.e., 160−20=140 ms) RTP sampling time, and last map the RTP sampling time to 1120 (i.e., 140*8=1120) as the RTP time stamp value.

The example with respect to Table 3 assumes the transmission time of each packet at the AT experiences the same delay after they are generated at the encoder and passed to the transmitter. However, this is not guaranteed and often a very small delay and delay variation may exist. Accordingly, instead as discussed in detail above, the estimation method of equation (2) may be used to determine a RTP time stamp from the BTS/RNC interface protocol time stamp. For an example, Table 4 shows the same RTP time stamp and corresponding sampling time as those in Table 3. However the packet ID and the corresponding transmission time has some delay variation. Packet ID 6 corresponds to transmission time of 40 ms (6*6.67 ms=40 ms). The packet ID for the next RTP packet is 10, corresponds to transmission time of 66.7 ms. And packet ID 12 corresponds to transmission time of 80 ms. The transmission time interval between consecutive packets is not exactly 20 ms as represented by the RTP TS. However, the transmission time can still be correlated with the RTP time stamp using the estimation method of equation (2).

TABLE 4

| Packet ID | Corresponding transmission time (ms) | RTP Time Stamp | Corresponding sampling time (ms) |
| --- | --- | --- | --- |
| 6 | 40 | 160 | 20 |
| 10 | 66.7 | 320 | 40 |
| 12 | 80 | 480 | 60 |

In this example, if there are missing packets, the decompressor 144 cannot decompress the packet successfully. Assuming the next successfully received packet has an ID of 23, the decompressor 144 can first map the value of packet ID 23 to 153.33 ms (i.e., 23*6.67=153.33 ms) transmission time, then use equation (2) to get the estimated RTP sampling time from packet ID 12, i.e., 60+int((153.33−80)/20, 1)*20=140 ms. And, then map the RTP sampling time to 1120 (i.e., 140*8=1120) as the RTP time stamp value.

Having conducted the repair operation, the decompressor 144 uses the determined RTP sequence number and RTP time stamp as the RTP sequence number and time stamp of the received packet after decompression. Then the decompressor 144 uses the CRC (cyclic redundancy check) in the ROHC header to perform error detection. If successful, the decompressor 144 will continue to decompress subsequent packets, and will have avoided decompression failure. As a result, the decompressor 144 will not need to send a feedback packet to the compressor 104 instructing the compressor 104 to resynchronize the compression status by sending the full header. The decompressor 144 will also avoid having to discard received packets with a compressed header, including uncorrupted packets, until the full header information is received in an uncompressed packet.

Forward Link

Figure 4:
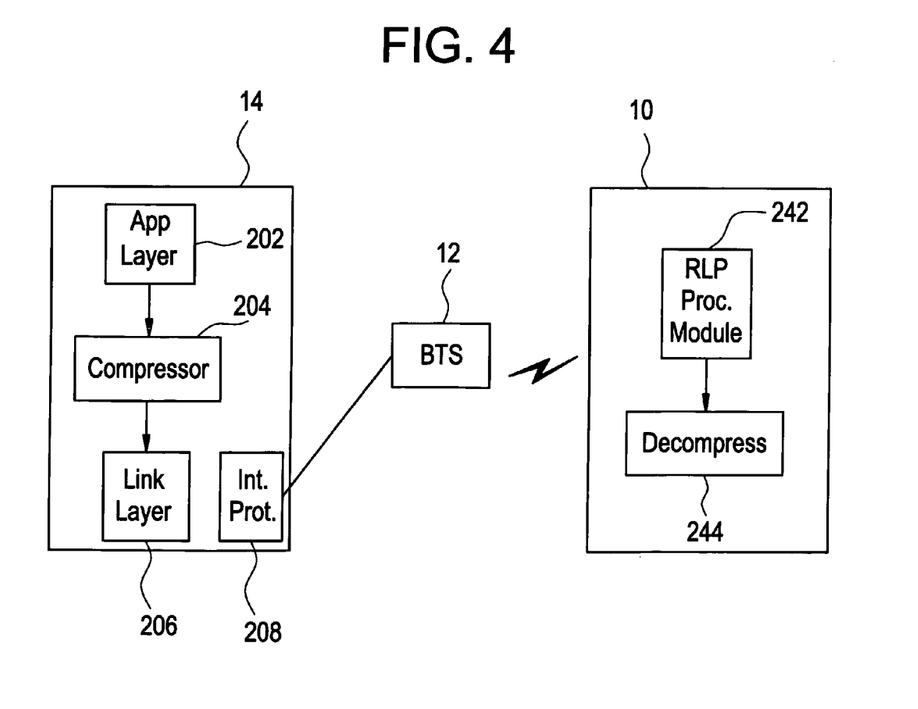
FIG. 4 illustrates the architecture of a portion of a wireless communication system for forward link communication according to an embodiment of the present invention.

While the detailed discussion above concerned compression and decompression on the reverse link, the method of the present invention discussed above, may also be applied on the forward link. FIG. 4 illustrates a functional block diagram of the AT 10, BTS 12 and the RNC 14 operating over the forward link, or downlink, according to an embodiment of the present invention. It will be understood that specific details of the AT 10, BTS 12 and RNC 14 well-known in the art (e.g., the RTP/UDP/IP protocol stacks, etc.) have not been shown for the sake of clarity.

Robust Header Compression (ROHC) channels may be established between the AT 10 and the BTS 12, the AT 10 and RNC 14 or the AT 10 and the PDSN 16. For the forward link, a compressor 204 and decompressor 244 may reside at the RNC 14 and AT 10 (as shown in FIG. 4), respectively. This embodiment will be described using this implementation. However, the description is equally applicable to the compressor residing at the BTS 12 or the PDSN 16.

As shown, the RNC 14 includes an application layer IP generator 202 that generates IP packets for a particular application. For example, a VoIP call consists of voice frame(s) encapsulated into a RTP/UDP/IP packet. With the establishment of a connection, the application layer generator 202 generates an application layer packet, which via the protocol stack becomes an RTP/UDP/IP packet. A header compressor 204 compresses the RTP/UDP/IP packets into ROHC packets, for example, using the ROHC algorithm. Subsequently, a link layer packet generator 206 generates a link layer packet by placing each ROHC packet into a RLP packet. As mentioned above, the RLP layer provides its own SN in the RLP header for packet delivery to provide a mechanism for recognizing missing data packets. Furthermore, as mentioned with respect to the forward link, the ROHC packet may be fragmented into more than one RLP packet.

A BTS/RNC interface protocol 208 at the RNC adds an interface protocol header to the RLP packet before sending the RLP packet to the BTS. More specifically, the BTS/RNC interface protocol encapsulates the RLP packets, and the header of the interface protocol packet includes a sequence number representing the transmission timing information of the RLP packet. The BTS 12 removes the BTS/RNC interface protocol header and passes the RLP packet to the AT 10 for decompression. Other protocols in addition to the RLP and interface protocol may be added depending on the system design.

The AT 10 includes a RLP processing module 242 and a decompressor 244. The RLP processing module 242 receives the RLP packet, obtains the RTP/UDP/IP packet there from, and passes the RLP SN and transmission timing information (hereinafter interchangeably referred to as "link layer information") to the decompressor 244 along with the RTP/UDP/IP packet.

The decompressor 244 decompresses the RTP/UDP/IP packets in the well-known manner according to, for example, the ROHC algorithm. As a result of the decompression, the decompressor 244 obtains, among other things, the RTP sequence number and the RTP time stamp. The decompressor 244 maps the RLP sequence number to the RTP sequence number, and maps the BTS/RNC interface protocol timing information to the RTP time stamp in the same manner described above in detail with respect to the reverse link.

If a decompression failure event occurs at the decompressor 244, then the decompressor 244 performs a local repair mechanism in the same manner as described above with respect to the reverse link, except for the determination of the RTP time stamp.

The BTS/RNC interface protocol header is not sent with the RLP packets from the BTS to the AT. Accordingly, the BTS/RNC interface protocol timing information is not available to the AT for use in the local repair mechanism.

In one embodiment, this timing information may be sent to the AT, albeit not in the BTS/RNC interface protocol header. For example, this timing information may be sent by BTS to AT via additional signaling, either with an added field in the RLP header or with an added message sent separately to the AT.

In another embodiment, the RTP time stamp (TS) is inferred using the repaired RTP sequence number (SN). The RTP time stamp is defined to identify the number of samples used to generate the RTP packet payload. When RTP packets carry payloads corresponding to a fixed sampling interval, and the sample rate is fixed, there is a unique mapping between the TS and SN. For example, for conversational speech, a fixed sampling rate of 8 kHz is often used. The speech payload is generated every 20 ms. This is equivalent to an increment of 160 in the RTP TS domain for consecutive packets. In other words, the RTP SN number is incremented by 1, while the TS is incremented by 160 during a talk spurt (where no silence suppression is applied.) In this case, from the method of recovering the RTP SN, the TS may be recovered indirectly.

As will be appreciated, the local repair mechanism in accordance with the system and methods provided may reduce the decompression failure and/or the resynchronization between the compressor and the decompressor.

The invention being thus described, it will be obvious that the same may be varied in many ways. Such variations are not to be regarded as a departure from the invention, and all such modifications are intended to be included within the scope of the invention.

We claim:

1. A method, comprising:
   determining, at a network element, a relationship between radio link protocol (RLP) sequence numbers in received RLP packets and real-time protocol (RTP) sequence numbers in RTP packets decompressed from the received RLP packets, wherein the determining of said relationship includes using a mapping table that maps the RLP sequence numbers to the RTP sequence numbers;
   determining, at the network element, an RTP sequence number associated with a compressed RTP packet based on the determined relationship and at least one of the RLP sequence numbers of the received RLP packet or packets forming the compressed RTP packet; and
   adding, at the network element, the determined RTP sequence number to the mapping table to determine a future relationship between the RLP sequence numbers and the RTP sequence numbers.

2. The method of claim 1, wherein
   the determining an RTP sequence number step determines the RTP sequence number based on the RLP-to-RTP map and the at least one RLP sequence number of the received RLP packet or packets forming the compressed RTP packet.

3. The method of claim 2, wherein the mapping step maps more than one RLP sequence number to a same RTP sequence number.

4. The method of claim 1, wherein
   the determining a relationship step includes determining an offset between RLP sequence numbers and RTP sequence numbers; and
   the determining an RTP sequence number step determines the RTP sequence number by adding the offset to the at least one RLP sequence number of the received RLP packets forming the compressed RTP packet.

5. The method of claim 1, wherein the determining an RTP sequence number step is conducted if an RLP packet is successfully received after a decompression failure event.

6. The method of claim 1, further comprising:
   determining a relationship between protocol time stamps associated with received RLP packets and RTP time stamps in RTP packets decompressed from the received RLP packets, the protocol time stamp being a time stamp added by a network elements interface protocol; and
   determining an RTP time stamp associated with the compressed RTP packet based on i) the determined relationship between the protocol time stamps and the RTP time stamps and ii) at least one of the protocol time stamps associated with the received RLP packet or packets forming the compressed RTP packet.

7. The method of claim 6, wherein
   the determining a relationship step includes mapping protocol time stamps to RTP time stamps; and
   the determining an RTP time stamp step determines the RTP stamp based on the protocol-to-RTP time stamp map and the at least one protocol time stamp of the received RLP packet or packets forming the compressed RTP packet.

8. The method of claim 7, wherein the mapping step maps the protocol time stamp to a transmission time of the RLP packet over the network elements interface, maps the transmission time of the RLP packet over the network elements interface to a transmission time of the RTP packet, and maps a transmission time of the RTP packet to the time stamp of the RTP packet.

9. The method of claim 6, wherein
   the determining a relationship step includes determining an offset between the protocol time stamps and the RTP time stamps; and
   the determining an RTP time stamp step determines the RTP time stamp by adding the offset to the at least one protocol time stamp of the received RLP packets forming the compressed RTP packet.

10. The method of claim 6, wherein the determining an RTP time stamp step is conducted if an RLP packet is successfully received after a decompression failure event.

11. The method of claim 1, further comprising:
   determining an RTP time stamp associated with the compressed RTP packet based on at least one protocol time stamp of the received RLP packet or packets forming the compressed RTP packet, the protocol time stamp of a previously received RLP packet, and the RTP time stamp of a previously received RTP packet; and
   the protocol time stamp being a time stamp added by a network elements interface protocol.

12. The method of claim 11, wherein the determining an RTP time stamp determines the RTP time stamp according to the following expression:

$$TS_{RTP2\_estimated} \cong TS_{RTP1} + int\left(\frac{TS_{interface2} - TS_{interface1}}{TS_{RTP\_interval}}, 1\right) \cdot TS_{RTP\_interval}$$

where $TS_{RTP2\_estimated}$ is the determined RTP time stamp, $TS_{RTP1}$ is the previous RTP time stamp, $TS_{interface1}$ is the previous protocol time stamp, $TS_{interface2}$ is the at least one protocol time stamp of the received RLP packet or packets forming the compressed RTP packet, and $TS_{RTP\_interval}$ is an interval between previously received consecutive RTP packets.

13. The method of claim 1, further comprising:
   determining a relationship between RTP sequence numbers and associated RTP time stamps; and
   inferring an RTP time stamp associated with the compressed RTP packet based on the determined RTP sequence number and the determined relationship between RTP sequence numbers and associated RTP time stamps.

14. The method of claim 1, further comprising:

deriving time stamps based on at least one of transmission timing information for the received RLP packets and local timing information at a base station receiving the received RLP packets;

determining a relationship between the derived time stamps associated with the received RLP packets and RTP time stamps in RTP packets decompressed from the received RLP packets; and determining an RTP time stamp associated with the compressed RTP packet based on i) the determined relationship between the derived time stamps and the RTP time stamps and at least one of the derived time stamps associated with the received RLP packet or packets forming the compressed RTP packet.

15. The method of claim 1, further comprising:

deriving time stamps based on at least one of transmission timing information for the received RLP packets and local timing information at a base station receiving the received RLP packets; and determining an RTP time stamp associated with the compressed RTP packet based on at least one derived time stamp for the received RLP packet or packets forming the compressed RTP packet, the derived time stamp for a previously received RLP packet, and the RTP time stamp of a previously received RTP packet.

16. A method, comprising:

determining, at a network element, a relationship between protocol time stamps associated with received radio link protocol (RLP) packets and real-time protocol (RTP) time stamps in RTP packets decompressed from the received RLP packets, wherein the determining of said relationship includes using a mapping table that maps the protocol time stamps to the RTP time stamps, the protocol time stamp being a time stamp added by a network elements interface protocol;

determining, at the network element, an RTP time stamp associated with a compressed RTP packet based on the determined relationship and at least one of the protocol time stamps of the received RLP packet or packets forming the compressed RTP packet; and adding, at the network element, the determined RTP time stamp to the mapping table to determine a future relationship between the protocol time stamps and the RTP time stamps.

17. The method of claim 16, wherein the determining an RTP time stamp step determines the RTP stamp based on the mapping table and the at least one protocol time stamp of the received RLP packet or packets forming the compressed RTP packet.

18. The method of claim 17, wherein the mapping step maps the protocol time stamp to a transmission time of the RLP packet over the network elements interface, maps the transmission time of the RLP packet over the network elements interface to a transmission time of the RTP packet, and maps a transmission time of the RTP packet to the time stamp of the RTP packet.

19. The method of claim 16, wherein the determining a relationship step includes determining an offset between the protocol time stamps and the RTP time stamps; and the determining an RTP time stamp step determines the RTP time stamp by adding the offset to the at least one protocol time stamp of the received RLP packets forming the compressed RTP packet.

20. The method of claim 16, wherein the determining an RTP time stamp step is conducted if an RLP packet is successfully received after a decompression failure event.

21. A method, comprising:

determining, at a network element, an real-time protocol (RTP) time stamp associated with the compressed RTP packet based on at least one protocol time stamp of a received radio link protocol (RLP) packet or packets forming a compressed RTP packet, the protocol time stamp of a previously received RLP packet, and the RTP time stamp of a previously received RTP packet;

adding, at the network element, the determined RTP time stamp to a mapping table to determine a future relationship between the protocol time stamps and the RTP time stamps, wherein the protocol time stamp is a time stamp added by a network elements interface protocol.

22. The method of claim 21, wherein the determining an RIP time stamp determines the RTP time stamp according to the following expression:

$$TS_{RTP2\_estimated} \cong TS_{RTP1} + int\left(\frac{TS_{interface2} - TS_{interface1}}{TS_{RTP\_interval}}, 1\right) \cdot TS_{RTP\_interval}$$

where $TS_{RTP2\_estimated}$ is the determined RTP time stamp, $TS_{RTP1}$ is the previous RTP time stamp, $TS_{interface1}$ is the previous protocol time stamp, $TS_{interface2}$ is the at least one protocol time stamp of the received RLP packet or packets forming the compressed RTP packet, and $TS_{RTP\_interval}$ is an interval between previously received consecutive RTP packets.

23. A method, comprising:

deriving, at a network element, time stamps based on at least one of transmission timing information for received radio link protocol (RLP) packets and local timing information at a base station receiving the received RLP packets;

determining, at the network element, a relationship between the derived time stamps associated with the received RLP packets and real-time protocol (RTP) time stamps in RTP packets decompressed from the received RLP packets, where the determining of said relationship includes using a mapping table that maps the derived time stamps to the RTP time stamps;

determining, at the network element, an RFP time stamp associated with a compressed RTP packet based on using a mapping table that at the determined relationship and at least one of the derived time stamps of the received RLP packet or packets forming the compressed RTP packet; and adding, at the network element, the determined RTP time stamp to the mapping table to determine a future relationship between the derived time stamps and the RTP time stamps.

24. A method, comprising:

deriving, at a first network element, time stamps based on at least one of transmission timing information for received radio link protocol (RLP) packets and local timing information at a base station receiving the received RLP packets;

determining, at the network element, a real-time protocol (RTP) time stamp associated with a compressed RTP packet based on at least one derived time stamp of the received RLP packet or packets forming a compressed RTP packet, the derived time stamp of a previously received RLP packet, and the RTP time stamp of a previously received RTP packet;

adding, at the network element, the determined RTP time stamp to a mapping table to determine a future relationship between the protocol time stamps and the RTP time stamps.

* * * * *